(12) United States Patent
Challagolla et al.

(10) Patent No.: US 10,635,688 B2
(45) Date of Patent: Apr. 28, 2020

(54) SYSTEMS AND METHODS FOR SIMPLIFIED AND PARTIALLY-AUTOMATED DATA TRANSFERS

(71) Applicant: The Travelers Indemnity Company, Hartford, CT (US)

(72) Inventors: Venu Challagolla, Avon, CT (US); Venkatraman Raman, Manchester, CT (US)

(73) Assignee: The Travelers Indemnity Company, Hartford, CT (US)

( * ) Notice: Subject to any disclaimer, the term of this patent is extended or adjusted under 35 U.S.C. 154(b) by 198 days.

(21) Appl. No.: 15/718,615

(22) Filed: Sep. 28, 2017

(65) Prior Publication Data

US 2019/0095506 A1    Mar. 28, 2019

(51) Int. Cl.
| G06F 16/25 | (2019.01) |
| G06F 11/10 | (2006.01) |
| G06F 3/0484 | (2013.01) |
| G06F 16/28 | (2019.01) |

(52) U.S. Cl.
CPC ........ *G06F 16/254* (2019.01); *G06F 3/04847* (2013.01); *G06F 11/1004* (2013.01); *G06F 16/252* (2019.01); *G06F 16/283* (2019.01)

(58) Field of Classification Search
CPC combination set(s) only.
See application file for complete search history.

(56) References Cited

U.S. PATENT DOCUMENTS

| 6,141,728 A * | 10/2000 | Simionescu | ........ G06F 12/0866 |
| | | | 711/113 |
| 2006/0221190 A1 * | 10/2006 | Limberis | ................. G06F 16/48 |
| | | | 348/207.1 |
| 2009/0177748 A1 * | 7/2009 | Serlet | ................... G06Q 10/107 |
| | | | 709/206 |

* cited by examiner

*Primary Examiner* — Shyue Jiunn Hwa
(74) *Attorney, Agent, or Firm* — Fincham Downs LLC; Carson C. K. Fincham

(57) ABSTRACT

Systems, methods, and articles of manufacture provide for simplified and partially-automated data operation services, such as data transfer, storage, management, and analysis operations. Non-IT data consumers may, for example, initiate such data operations by providing only a subset of the required parameters for the operation, with the specially-coded system automatically fetching any missing parameters or values from one or more metadata stores and initiating the requested operation.

12 Claims, 8 Drawing Sheets

SYSTEMS AND METHODS FOR SIMPLIFIED AND PARTIALLY-AUTOMATED DATA TRANSFERS

BACKGROUND

Storage, retrieval, and analysis of large data sets has become increasingly complex as the quantity and need for such data has increased dramatically over the years. "Big data" is a term that is now utilized to describe data sets that have such high levels of complexity and/or breadth that traditional data processing applications are not adequate to manage and maintain the data. Accordingly, to meet the needs associated with "big data", much Information Technology (IT) investment is often required to purchase or develop specialized data management hardware and software solutions. Two of the most commonly utilized proprietary solutions comprise data storage systems and proprietary software applications offered by the Oracle® Corporation of Redwood City, Calif. (e.g., Oracle® Database 12c™) and Teradata® of Dayton, Ohio (e.g., the Teradata® Integrated Big Data Platform). The cost of such proprietary end-to-end big data solutions is significant, however, including the necessity of end-users being properly trained for each implemented proprietary platform. In an effort to reduce the proprietary known-how overhead of big data systems, open-source solutions such as Hadoop® available from the Apache™ Software Foundation of Forest Hill, Md., have been developed. Hadoop® leverages a "MapReduce" programming architecture (as opposed to the traditional Relational Database Management System (RDBMS) model) and utilizes distributed storage and data processing to manage large data sets. For data transfer operations, Apache™ Sqoop™ (SQL+Hadoop®) is available to handle bulk data migration between the Hadoop® Distributed File System (HDFS) and relational databases, utilizing a command-line interface. Even with these open-source tools, however, the cost of end-user training remains high and data transfer procedures remain limited to specialized personnel.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Data transfers in "big data" systems remain complex and specialized operations that require significant investment of capital and human resource training. While open-source solutions, such as Hadoop® (and Sqoop™), have opened up new avenues of system architecture and functionality, little has been accomplished that broadens the availability of such tools to additional personnel resources (and/or to resources with lower levels of IT training or expertise). Users of Sqoop™, for example, must input values for many variables, such as data types, compression types, etc., in order to initiate a data transfer. Only users with specialized data structure knowledge or training are likely to know these values (or even understand what the variables represent).

In accordance with embodiments herein, these and other deficiencies of previous efforts are remedied by providing systems, apparatus, methods, and articles of manufacture for simplified and partially-automated data transfer operations. In some embodiments, for example, a set of logical rules and/or procedures may be coded to define a specialized data archival and/or retrieval tool that permits lesser-trained personnel to initiate data transfer operations. According to some embodiments, such a lesser-trained user may input a number of parameter values that is smaller than a minimum number of values required to undertake a data transfer operation. The specially-coded tool may identify the missing variables (and/or values thereof) and may automatically retrieve or fetch (or "pull") the appropriate and/or necessary parameters and/or values. The data transfer operation may then, for example, be initiated utilizing the input provided by the user in combination with the automatically-retrieved parameters and/or values. In some embodiments, one or more of the missing parameters and/or values may be retrieved from an operational metadata storage, such as a data file including column-level parameter details for various databases and tables thereof. According to some embodiments, one or more of the missing parameters and/or values may be retrieved from a transactional metadata storage, such as a database storing information descriptive of previous queries and/or data transfers initiated by a particular user, class or group of users, etc.

II. Systems

Figure 1:
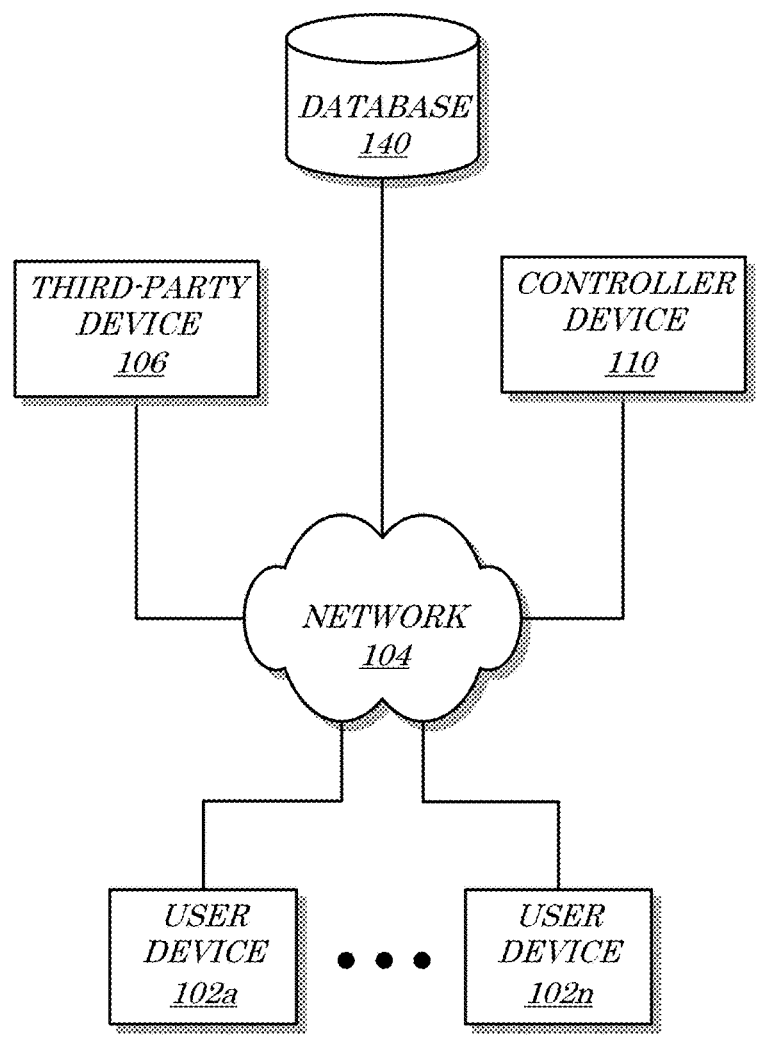
FIG. 1 is a block diagram of a system according to some embodiments.

Referring first to FIG. 1, a block diagram of a system 100 according to some embodiments is shown. In some embodiments, the system 100 may comprise a plurality of user devices 102a-n, a network 104, a third-party device 106, a controller device 110, and/or a database 140. As depicted in FIG. 1, any or all of the devices 102a-n, 106, 110, 140 (or any combinations thereof) may be in communication via the network 104. In some embodiments, the system 100 may be utilized to carry out simplified and/or partially-automatic data transfers, queries, and/or analysis procedures, as described herein. The controller device 110 may, for example, interface with one or more of the user devices 102a-n and/or the third-party device 106 to receive user input and utilize the input, e.g., in conjunction with automatically-identified additional inputs, to execute one or more data processing transfers, algorithms, and/or or analytical models. In a non-limiting exemplary case of a user in an insurance company desiring to make a copy of a production-level transaction table storing data defining recently underwritten insurance policies, for example, specialized code that automatically identifies and/or fetches missing parameters and/or values may be executed by the controller 110 to provide the requested data transfer/operation (e.g., via the user devices 102a-n).

Fewer or more components 102a-n, 104, 106, 110, 140 and/or various configurations of the depicted components 102a-n, 104, 106, 110, 140 may be included in the production environment system 100 without deviating from the scope of embodiments described herein. In some embodiments, the components 102*a*-*n*, 104, 106, 110, 140 may be similar in configuration and/or functionality to similarly named and/or numbered components, as described herein. In some embodiments, the system 100 (and/or portion thereof) may comprise a simplified and/or partially-automatic data processing program, system, and/or platform programmed and/or otherwise configured to execute, conduct, and/or facilitate the method 400 of FIG. 4 herein, and/or portions thereof.

The user devices 102*a*-*n*, in some embodiments, may comprise any types or configurations of computing, mobile electronic, network, user, and/or communication devices that are or become known or practicable. The user devices 102*a*-*n* may, for example, comprise one or more Personal Computer (PC) devices, computer workstations (e.g., an underwriter workstation), tablet computers, such as an iPad® manufactured by Apple®, Inc. of Cupertino, Calif., and/or cellular and/or wireless telephones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102*a*-*n* may comprise devices owned and/or operated by one or more users, such as data analysts, data reporting specialists, business analysts, and/or non-IT personnel, such as marketing, sales, and/or management users. According to some embodiments, the user devices 102*a*-*n* may communicate with the controller device 110 via the network 104 to conduct data transfer, analysis, management, filtering, reporting, and/or other data processing processes without requiring all necessary parameters and/or values to be entered by the user, as described herein.

In such a manner, for example, even non-IT personnel that lack knowledge of some (or many) parameters and/or values required to conduct a data transfer (or analysis or management) operation may be empowered to conduct such operations by leveraging the specially-coded rules and/or logic that automatically identifies and fetches (e.g., as executed by the controller device 110) the messing parameters/values. Marketing or sales personnel (e.g., utilizing the user devices 102*a*-*n*) may accordingly benefit by being able to conduct data analysis operations that previously required IT support, while the business (e.g., an insurance business) may benefit be reducing the amount of IT-training expenditures required to allow such personnel to access "big data" systems, such as the system 100.

In some embodiments, the user devices 102*a*-*n* may interface with the controller device 110 to effectuate communications (direct or indirect) with one or more other user devices 102*a*-*n* (such communication not explicitly shown in FIG. 1) operated by other users, for example. In some embodiments, the user devices 102*a*-*n* may interface with the controller device 110 to effectuate communications (direct or indirect) with the third-party device 106 (such communication also not explicitly shown in FIG. 1). In some embodiments, the user devices 102*a*-*n* and/or the third-party device 106 may comprise one or more data stores and/or other data acquisition and/or input devices. In some embodiments, input from such devices 102*a*-*n*, 106 may be provided to the controller device 110, to be utilized as partial input required to initiate a data transfer, management, and/or analysis procedure, such as an append, merge, and/or full refresh (e.g., truncate and load) data transfer operation.

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the user devices 102*a*-*n*, the third-party device 106, and/or the database 140. In some embodiments, the network 104 may comprise direct communications links between any or all of the components 102*a*-*n*, 106, 110, 140 of the system 100. The user devices 102*a*-*n* may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102*a*-*n* may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a*-*n*, 106, 110, 140 of the system 100. The network 104 may comprise one or more cellular telephone networks with communication links between the user devices 102*a*-*n* and the controller device 110, for example, and/or may comprise the Internet, with communication links between the controller device 110 and the third-party device 106 and/or the database 140, for example.

The third-party device 106, in some embodiments, may comprise any type or configuration of a computerized processing device, such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the user devices 102*a*-*n* or the controller device 110). The third-party device 106 may, for example, be owned and/or operated by data and/or data service provider, such as Dun & Bradstreet® Credibility Corporation (and/or a subsidiary thereof, such as Hoovers™), Deloitte® Development, LLC, Experian™ Information Solutions, Inc., and/or Edmunds.com®, Inc. In some embodiments, the third-party device 106 may supply and/or provide data, such as policy information (e.g., governing state data), business and/or other classification data to the controller device 110 and/or the user devices 102*a*-*n*. In some embodiments, the third-party device 106 may comprise a plurality of devices and/or may be associated with a plurality of third-party entities. According to some embodiments, the third-party device 106 may comprise the database 140 (or a portion thereof), such as in the case the third-party device 106 comprises a third-party data storage service, device, and/or system, such as the Amazon® Simple Storage Service (Amazon® S3™) available from Amazon.com, Inc. of Seattle, Wash. or an open-source third-party database service, such as MongoDB™ available from MongoDB, Inc. of New York, N.Y.

In some embodiments, the controller device 110 may comprise an electronic and/or computerized controller device, such as a computer server communicatively coupled to interface with the user devices 102a-n and/or the third-party device 106 (directly and/or indirectly). The controller device 110 may, for example, comprise one or more PowerEdge™ M910 blade servers manufactured by Dell®, Inc. of Round Rock, Tex. which may include one or more Eight-Core Intel® Xeon® 7500 Series electronic processing devices. In some embodiments, the controller device 110 may comprise a plurality of processing devices specially-programmed to execute and/or conduct processes that are not practicable without the aid of the controller device 110. The controller device 110 may, for example, execute specially-coded instructions, logic, and/or rules to automatically fetch and utilize missing data transfer parameters and/or values, as described herein, such execution not being capable of being conducted without the benefit of the specially-programmed controller 110. According to some embodiments, the controller device 110 may be located remote from one or more of the user devices 102a-n and/or the third-party device 106. The controller device 110 may also or alternatively comprise a plurality of electronic processing devices located at one or more various sites and/or locations (e.g., in the case that the controller 110 implements a distributed storage and/or processing "big data" architecture such as Hadoop®).

According to some embodiments, the controller device 110 may store and/or execute specially programmed instructions to operate in accordance with embodiments described herein. The controller device 110 may, for example, execute one or more specially-coded programs, modules, and/or routines that facilitate a simplified and/or partially-automatic data transfer solution, e.g., in an online environment, as utilized in various industry data processing applications, such as, but not limited to, insurance and/or risk analysis, and/or handling, processing, pricing, underwriting, and/or issuance of one or more insurance and/or underwriting products and/or claims with respect thereto. According to some embodiments, the controller device 110 may comprise a computerized processing device, such as a PC, laptop computer, computer server, and/or other electronic device, to manage and/or facilitate transactions and/or communications regarding the user devices 102a-n. An insurance company employee, sales agent, claim handler, underwriter, data analyst, actuary, marketing professional, and/or other user may, for example, utilize the controller device 110 to conduct data transfer, storage, management, and/or analysis operations in a "simplified" (e.g., only being required to input a subset of required parameters and/or values thereof) and/or "partially-automated" (e.g., the controller device 110 automatically identifies, fetches, and employs any missing required parameters and/or values for the requested data operation) manner, as described herein.

In some embodiments, the controller device 110 and/or the third-party device 106 (and/or the user devices 102a-n) may be in communication with the database 140. The database 140 may store, for example, transactional data, policy data, business classification data, location, parameter, argument (e.g., command-line), and/or value data (e.g., input) obtained from the user devices 102a-n, stored metadata defining variables and/or variable values, required data transfer parameters and/or values data, and/or instructions that cause various devices (e.g., the controller device 110 and/or the user devices 102a-n) to operate in accordance with embodiments described herein. The database 140 may store, for example, one or more parameter files (e.g., the example parameter file 344-1 of FIG. 3 herein), a required parameters file (e.g., the example required parameters file 344-2 of FIG. 3 herein), database schema and/or metadata information, user and/or user transaction metadata information, and/or stored rules, logic, and/or thresholds (e.g., for analyzing user input and providing simplified and/or partially-automated data transfer operations in response thereto).

In some embodiments, the database 140 may comprise any type, configuration, and/or quantity of data storage devices that are or become known or practicable. The database 140 may, for example, comprise an array of optical and/or solid-state hard drives configured to store data transfer metadata (e.g., transactional and/or operational), user input, and/or various operating instructions, rules, logic, thresholds, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the user devices 102a-n or third-party device 106 may comprise the database 140 or a portion thereof, for example, and/or the controller device 110 may comprise the database or a portion thereof.

Figure 2:
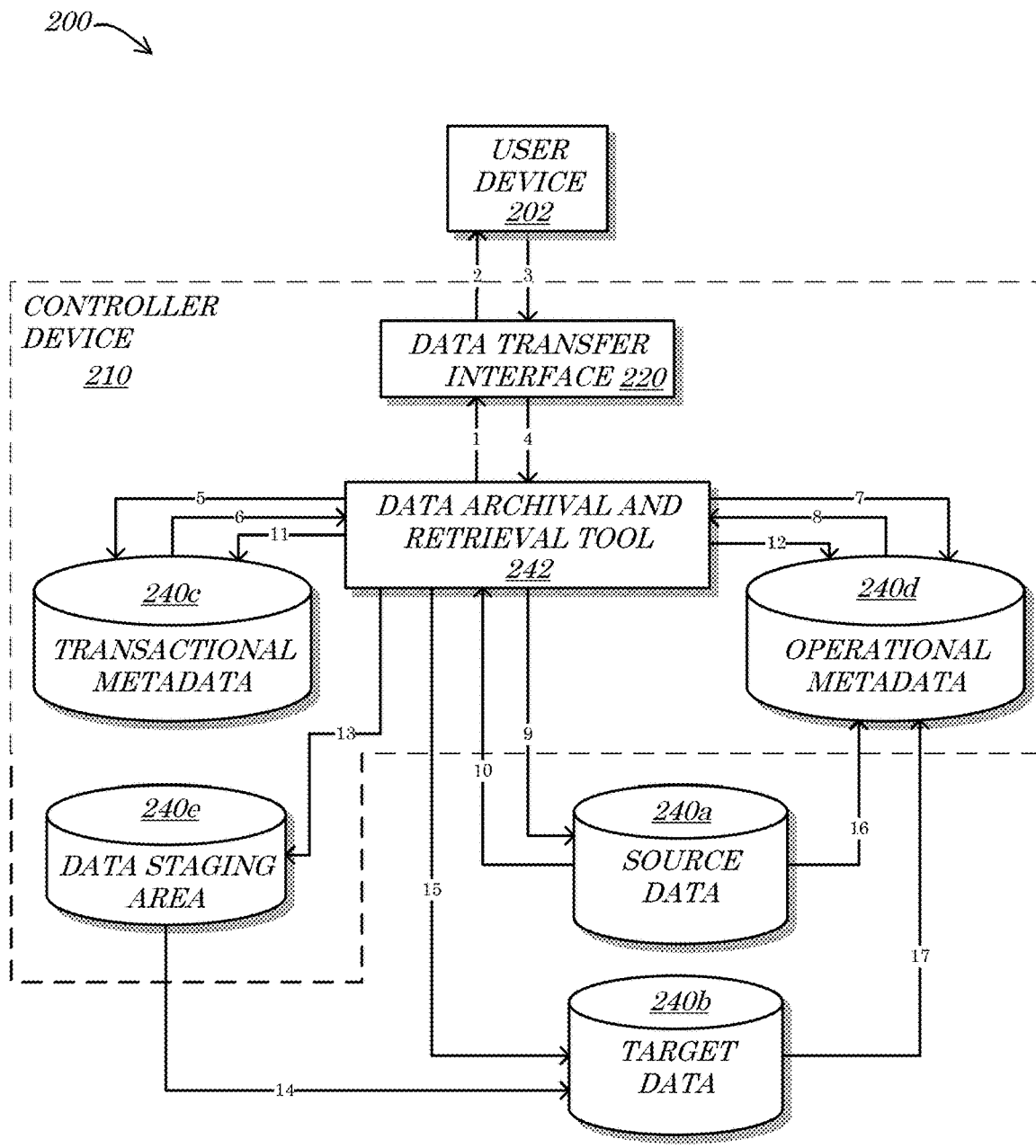
FIG. 2 is a block diagram of a system according to some embodiments.

Turning now to FIG. 2, a block diagram of a system 200 according to some embodiments is shown. In some embodiments, the system 200 may comprise a user device 202 in communication with a controller device 210. In some embodiments, the controller device 210 may comprise a data transfer interface 220 (e.g., provided to and/or in communication with the user device 202) and/or may comprise or be in communication with one or more data storage devices, such as a source data device 240a, a target data device 240b, a transactional metadata device 240c, an operational metadata device 240d, and/or a data staging area device 240e. According to some embodiments, the controller device 210 may comprise a computerized and/or electronic device utilized to execute one or more programs, applications, and/or other specially-coded instructions, such as a data archival and retrieval tool 242. In accordance with some embodiments, the controller device 210 may execute and/or utilize the data archival and retrieval tool 242 to provide simplified and/or partially-automated data transfer, storage, management, and/or analysis operations upon request of a user (not shown) of the user device 202.

In some embodiments, the controller device 210 may call, execute, initiate, and/or trigger a generation of the data transfer interface 220 (and/or a first instance and/or configuration thereof), e.g., via a first path "1" as depicted in FIG. 2. The data archival and retrieval tool 242 may, for example, define and/or store instructions that are specially-coded to provide a plurality of specialized interface input features (not shown) to create, define, generate, and/or provide the data transfer interface 220. According to some embodiments, the data transfer interface 220 may be provided to the user device 202, e.g., via a second path "2". The data transfer interface 220 may, in some embodiments, comprise any or all of a file transfer or upload interface, a command-line interface (e.g., a UNIX®, Linux, mainframe, or Windows® interface), and/or a specially-coded Application Programming Interface (API; e.g., a Java™ interface). While the data transfer interface 220 is depicted as being part of or residing on the controller device 210, in some embodiments the data transfer interface 220 may be part of and/or reside on the user device 202, on the controller device 210, on a third-party device (not shown in FIG. 2; e.g., the third-party device 106 of FIG. 1), or any combination thereof. The data transfer interface 220 may comprise, for example, a web-based API that is available via any user device 202 that access a particular network address, such as a specific URL. In some embodiments, a portion of the data transfer interface 220 and/or instructions defining the data transfer interface 220 may be resident on the user device 202 (e.g., a client-side application that directs the user device 202 to access the controller device 210).

According to some embodiments, input may be provided by the user device 202 via and/or to the data transfer interface 220, e.g., via a third path "3". The user device 202 may provide and/or define, for example, a first set of data inputs comprising one or more parameters, arguments, and/or values associated with a desired data transfer, storage, management, and/or analysis operation. The first set of data inputs may comprise, in some embodiments, a selection and/or definition of a database name and a table name identifying, e.g., a particular database and data table stored in the source data device 240a. According to some embodiments, the first set of data inputs (or a portion thereof) may be provided in one or more parameter files, such as one or more configuration (".cfg"), Austosys job, spreadsheet (e.g., Microsoft® Excel®), and/or other data files. In some embodiments, the first set of data inputs (or a portion thereof) may be provided as one or more command-line arguments. According to some embodiments, the data transfer interface 220 may suggest or recommend certain parameters and/or values to the user by providing a menu (not shown) of available database parameters based on previous operations conducted by the user (or a group to which the user belongs; e.g., as stored in the transactional metadata device 240c) and/or based on database and/or data storage details stored with respect to the source data device 240a (e.g., as stored in the operational metadata device 240d).

In some embodiments, the first set of data inputs may be provided to the data archival and retrieval tool 242, e.g., via a fourth path "4". According to some embodiments, the provision of the first set of data inputs to the data archival and retrieval tool 242 may comprise a job (e.g., an Autosys-executed and/or Apache™ Pig™-executed job) that sends a command to the controller device 210 (and/or the data archival and retrieval tool 242) to initiate a specific data transfer, storage, management, and/or analysis operation. In some embodiments, the specific type of desired operation may also be indicated by the first set of data inputs. The data transfer interface 220 may comprise a GUI picklist element (not shown) of available data transfer operation types, such as "append", "merge", "full refresh", "copy", "import", and/or "export", for example, via which the user may indicate a desired operation type (which may be transmitted as part of the first set of data inputs at "3" and/or "4").

According to some embodiments, the data archival and retrieval tool 242 may receive the request/command and may respond by initiating a specialized routine that checks the first set of data inputs for completeness. The data archival and retrieval tool 242 may, for example, compare the first set of data inputs to a listing or rules (not explicitly shown in FIG. 2) defining required parameters and/or values for the desired operation. In the case that any required parameters and/or values are identified as missing (e.g., a set of missing inputs) from the first set of data inputs, the data archival and retrieval tool 242 may automatically (e.g., without additional input from the user device 202) attempt to retrieve the missing parameters and/or values. The data archival and retrieval tool 242 may, for example, query the transactional metadata device 240c to identify any parameters and/or values that the user and/or user device 202 have previously utilized, e.g., via a fifth path "5". In some embodiments, the data archival and retrieval tool 242 may search the transactional metadata device 240c to discover, locate, and/or fetch a first portion or subset of the set of missing inputs. Any data stored in the transactional metadata device 240c that matches any of the set of missing inputs may be retrieved or fetched, for example, via a sixth path "6". In some embodiments, the data archival and retrieval tool 242 may also or alternatively query the operational metadata device 240d to identify any parameters and/or values that are stored in relation to the source data device 240a (e.g., identified by the first set of data inputs), e.g., via a sixth path "7". In some embodiments, the data archival and retrieval tool 242 may search the operational metadata device 240d to discover, locate, and/or fetch a second portion or subset of the set of missing inputs. Any data stored in the operational metadata device 240d that matches any of the set of missing inputs may be retrieved or fetched, for example, via an eighth path "8". In such a manner, for example, the user of the user device 202, that requests the data operation, need not know, provide, or input all parameters required for the desired operation (e.g., the data operation may be "simplified" and/or "partially-automated").

According to some embodiments, the data archival and retrieval tool 242 may call, execute, initiate, and/or trigger a data retrieval from the source data device 240a, e.g., via a ninth path "9". The data retrieval may comprise, for example, a query and/or data transformation instructions that, e.g., call, identify, and/or request data from the source data device 240a. The call/request may, for example, be structured by and/or include the first set of data inputs (e.g., as provided by the user device 202) and either or both of the first and second sets of missing inputs (e.g., fetched from the transactional metadata device 240c and/or the operational metadata device 240d, respectively). According to some embodiments, the data retrieval call/request may comprise an indication of authentication credentials. In the case that the source data device 240a requires credentials for access, for example, credentials for the user that are either pre-stored in the transactional metadata device 240c or provided by the user as part of the first set of data inputs may be forwarded to the source data device 240a to permit access to the desired data. In some embodiments, any requested data (and associated metadata) may be acquired by the data archival and retrieval tool 242 from the source data device 240a, e.g., via a tenth path "10".

According to some embodiments, the data archival and retrieval tool 242 may analyze and/or verify the data received from the source data device 240a. A row count, timestamp, and/or a checksum may be utilized, for example, to verify that the data retrieval was successful. In some embodiments, a number of data rows retrieved may be compared to a number of data rows resident in the source data device 240a to verify that the correct amount of data was retrieved. According to some embodiments, a sum of a data column from the retrieved data may be compared to a sum for the same column in the source data device 240a to verify that the correct data was retrieved. In some embodiments, timestamp data for the request/call may be compared to timestamp data stored in the source data device 240a to identify which (if any) rows of data have changed (e.g., been added or edited) since the last data retrieval. In such a manner, for example, data may be verified and/or incrementally retrieved (e.g., the timestamp check may be accomplished prior to the data retrieval to cause an incremental retrieval via the tenth path "10"). In some embodiments, the user may define the checksum column via the first set of data inputs, while in some embodiments the checksum column may be automatically selected (e.g., randomly, or based on data type). According to some embodiments, each of the checksum validation and the row count validation must be successful for the data retrieval to be considered valid.

In some embodiments, in the case that the data validation is not successful, the user may be notified (e.g., via a transmission to the user device 202; such transmission not separately depicted) of any errors. According to some embodiments, any data validation errors may be stored in one or more of the transactional metadata device 240c, e.g., via an eleventh path "11", and the operational metadata device 240d, e.g., via a twelfth path "12". Similarly, any other metadata, such as transaction or request details (e.g., the first set of data inputs, the first and/or second sets of missing inputs), user information, and/or source (e.g., an imported schema, data types, compression types, etc.) or target data information (e.g., file format, location information, partition or bucket concepts, etc.) may be stored in one or more of the transactional metadata device 240c, e.g., via the eleventh path "11", and the operational metadata device 240d, e.g., via the twelfth path "12".

According to some embodiments, e.g., in the case that the data validation is successful, the retrieved or fetched data may be stored in the data staging area device 240e, e.g., via a thirteenth path "13". In the case of data import operations, for example, the data retrieved from the source data device 240a may be stored in the data staging area device 240e to conduct the data validation and/or to provide a copy of the data for user review and/or manipulation. Once the data is validated and/or indicated as ready for final transfer/storage by the user (e.g., via an indication received from the user device 202; such receiving not separately depicted in FIG. 2), the data may be stored in the target data device 240b, e.g., via a fourteenth path "14". In some embodiments, such as in the case of data export operations, the retrieved data may be stored directly in the target data device 240b, e.g., via a fifteenth path "15" (without requiring the data staging area device 240e). In some embodiments, metadata descriptive of data stored in the source data device 240a and/or the target data device 240b may be loaded into the operational metadata device 240d, e.g., via a sixteenth path "16" and/or seventeenth path "17", respectively. In such a manner, for example, upon receiving any additional data operation requests from the user device 202 (or another user device, not separately depicted) that are missing required parameters and/or values (such as a data type for a requested column in a particular database stored in the source data device 240a or an archive type for a flat file stored in the target data device 240b), such missing parameters and/or values may be readily identifiable and acquired from the operational metadata device 240d.

In some embodiments, any or all of the paths may comprise electronic communications and/or network pathways. Any or all of these depicted and/or described paths with respect to FIG. 2 may comprise any number, type, and/or configuration of pathways and/or associated physical objects that are or become known or practicable. While three (3) different pathways ("5", "6", and "11") are depicted and described as providing communicative functionality between the data archival and retrieval tool 242 and the transactional metadata device 240c, for example, all communications along those three (3) pathways may be effectuated through or via a single object or medium, such as a single wire, cable (e.g., coaxial), trace, and/or or connection (e.g., a packet-switched communication session connection, a cellular wireless communications session, etc.). In some embodiments, different communicative transmissions and/or pathways may be effectuated and/or implemented, controlled, and/or managed by different processing devices and/or components. The system 200 may, for example, utilize and/or employ a first server and/or processing unit (not separately depicted) or thread to effectuate the fifth ("5") and sixth ("6") pathways, while a second server and/or processing unit or thread may effectuate the seventh ("7") and eighth ("8") pathways. The consecutive numbering and/or descriptions of the different pathways are utilized for convenience of description only, are not generally limiting, and are not necessarily indicative of chronological or temporal relationships between the pathways or related functionalities. Particularly in the case that different processing units of the system 200 effectuate different pathways, for example, such pathways (e.g., the eleventh ("11") and twelfth ("12") pathways) may be effectuated simultaneously (e.g., in the case that the system 200 is configured to provide multi-threaded processing). While the numbering and descriptions of the various pathways are not generally limiting for many embodiments, in one embodiment the numbering is specifically limited to a particular order of process execution.

According to some embodiments, any or all of the data storage devices 240a-e may comprise one or more devices disposed at one or more locations. In some embodiments, for example, the controller device 210 may comprise a single memory device (not shown) that comprises, stores, is segmented into, and/or is defined by each of the transactional metadata device 240c, the operational metadata device 240d, and the data staging area device 240e. Any or all of the data storage devices 240a-e may, for example, be embodied in a single device and may comprise different data partitions, databases, files, and/or data storage structures (e.g., flat files and relational databases).

III. Data Structures

Figure 3:
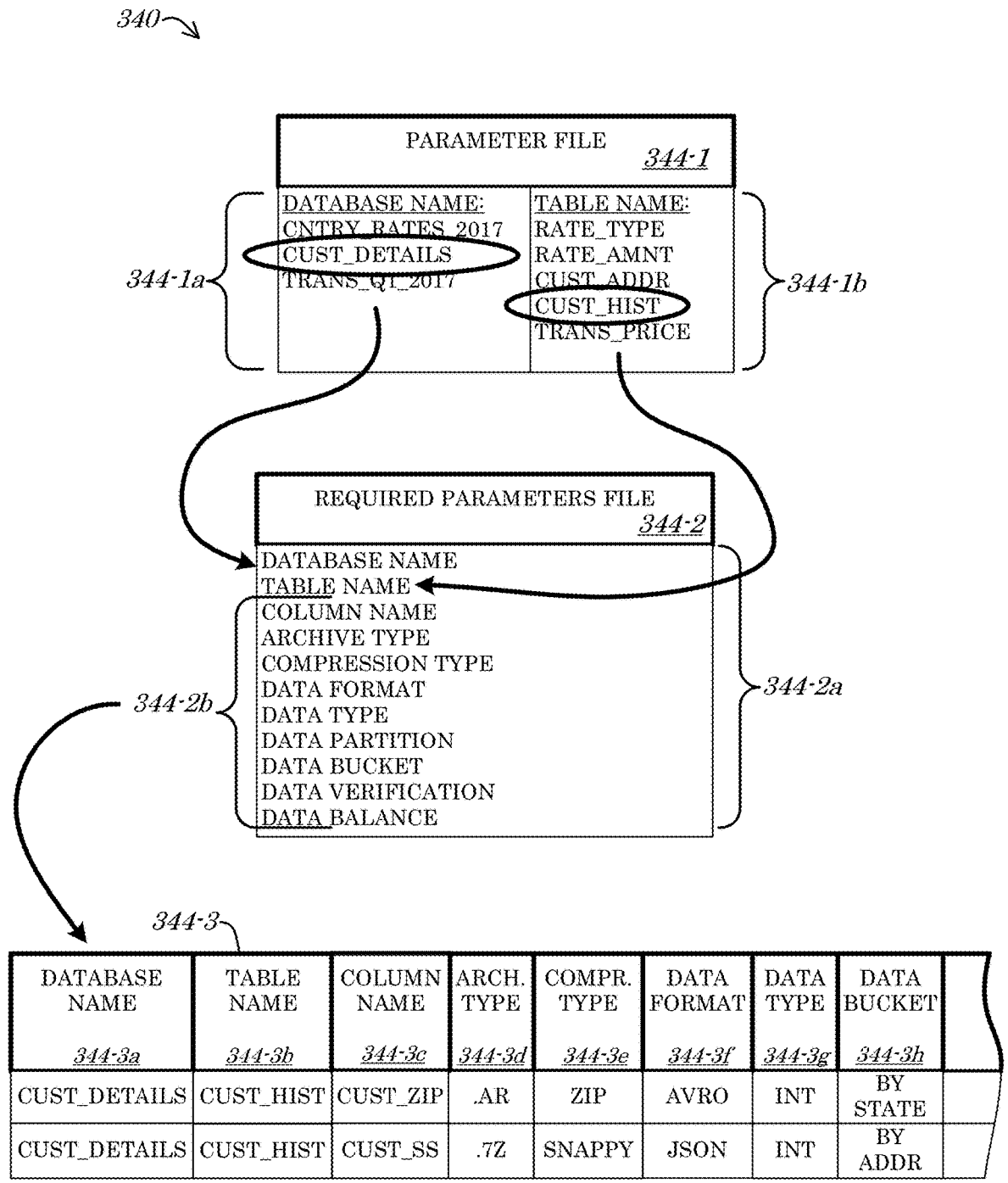
FIG. 3 is a block diagram of an example data storage structure according to some embodiments.

Turning now to FIG. 3, a block diagram of an example data storage structure 340 according to some embodiments is shown. In some embodiments, the example data storage structure 340 may, for example, comprise a parameter file 344-1, a required parameters file 344-2, and/or a metadata table 344-3. In some embodiments, the parameter file 344-1 may be received from and/or defined by a user and may comprise, for example, an indication of one or more database names 344-1a and table names 344-1b. According to some embodiments, the parameter file 344-1 may comprise a flat file, shell script, Autosys job, command, command-line data, and/or other executable and/or referential file that stores data transfer, storage, management, and/or analysis parameters, such as the depicted database names 344-1a and table names 344-1b. According to some embodiments, the parameter file 344-1 depicted in FIG. 3 may comprise a text or configuration file utilized by a batch or executable job program, script, API, and/or command string (not separately shown). In some embodiments, the parameter file 344-1 may comprise and/or identify additional parameters and/or values thereof (not shown), such as compression types, data types, archive types, data formats, data buckets, data partitions, database keys, data index information, data verification information, etc.

In some embodiments, the parameter file 344-1 may be compared to the required parameters file 344-2 to automatically identify any required parameters/values 344-2a that are missing from the parameter file 344-1. According to some embodiments, different requested data operations may necessitate different sets of required parameters/values 344-2a. In some embodiments, a different required parameters file 344-2 may be stored and utilized for different types of requested data operations. Input provided by a user that indicates a desired data transfer, storage, management, and/or analysis operation, for example, may trigger an identification and/or utilization of (e.g., loading into resident memory) one of a plurality of required parameters files 344-2 that correspond to the desired/requested operation. As depicted in FIG. 3, the database names 344-1a and table names 344-1b of the parameter file 344-1 may be compared to the required parameters/values 344-2a to identify a set of missing parameters/values 344-2b.

According to some embodiments, the metadata table 344-3 may be queried and/or searched utilizing the missing parameters/values 344-2b. The metadata table 344-3 may comprise a transactional and/or operational metadata store comprising, for example, a database name field 344-3a, a table name field 344-3b, a column name field 344-3c, an archive type field 344-3d, a compression type field 344-3e, a data format field 344-3f, a data type field 344-3g, and/or a data bucket field 344-3h. The metadata table 344-3 may be searched to identify any appropriate data related to the database names 344-1a and table names 344-1b input via the parameter file 344-1. According to some embodiments, each of the missing parameters/values 344-2b may be located in the metadata table 344-3 and returned to be appended or combined with the database names 344-1a and table names 344-1b to define the full set of required parameters/values 344-2a applicable to the desired/requested data operation. Such full set of required parameters/values 344-2a may then be utilized, for example, to initiate the operation. In such a manner, the user providing the parameter file 344-1 may experience a "simplified" data process by not being required to input all of the required parameters/values 344-2a.

In some embodiments, the parameter file 344-1 may be compared to the metadata table 344-3 to verify the database names 344-1a and table names 344-1b (and/or other data therein). In the case that the parameter file 344-1 additionally identifies a column name (not shown in FIG. 3) stored in the column name field 344-3c, such as "CUST_ZIP" and a data type of "Boolean" (also not shown), for example, the corresponding data type of "INT" (for integer) stored in the data type field 344-3g may be retrieved and compared to the input "Boolean" value for the parameter. In such an example where the input data type is incorrect (e.g., doesn't match), the user may be notified and/or the correct data type may be selected to override the input value.

According to some embodiments, the required parameters/values 344-2a and/or the data identified thereby may be filtered or masked. Based on a user identifier, group, security class, location, and/or user device utilized to provide the parameter file 344-2, for example, certain types of data may be filtered, hidden, masked, and/or simply not provided as a result of the requested operation. In the case that a user requests the "CUST_HIST" table identified by the table names 344-1b from the "CUST_DETAILS" database identified by the database names 344-1a and the identified table is found to have a column named "CUST_SS", as indicated by the column name field 344-3c of the metadata table 344-3, for example, it may be inferred (e.g., based on application of stored rules and/or logic) that the column contains Social Security numbers of customers, and should accordingly be hidden, masked, or not returned with the rest of the data from the "CUST_HIST" table. In some embodiments, certain identified data types, such as Social Security numbers, customer credit card numbers, addresses, etc. may be prevented from being accessed by users of certain security classes, from certain departments, etc. In some embodiments, this may be accomplished by identifying applicable column names, as in the case of the example "CUST_SS" column name. In some embodiments, data values may be analyzed to identify, e.g., data types having a certain number of integers, such as a nine (9)-digit number that may be inferred to be a Social Security number or a fifteen (15) or sixteen (16)-digit number that may be inferred to be a credit card number.

According to some embodiments, fewer or more data fields and/or data items comprising the parameter file 344-1, the required parameters file 344-2, and/or the metadata table 344-3, than are shown may be included. Only a portion of one or more files and/or data lists or stores is necessarily shown in FIG. 3, for example, and other data, data types, database fields, columns, structures, orientations, quantities, and/or configurations may be utilized without deviating from the scope of some embodiments. Further, the data depicted in the parameter file 344-1, the required parameters file 344-2, and/or the metadata table 344-3 is provided solely for exemplary and illustrative purposes and does not limit the scope of embodiments described herein.

Figure 4:
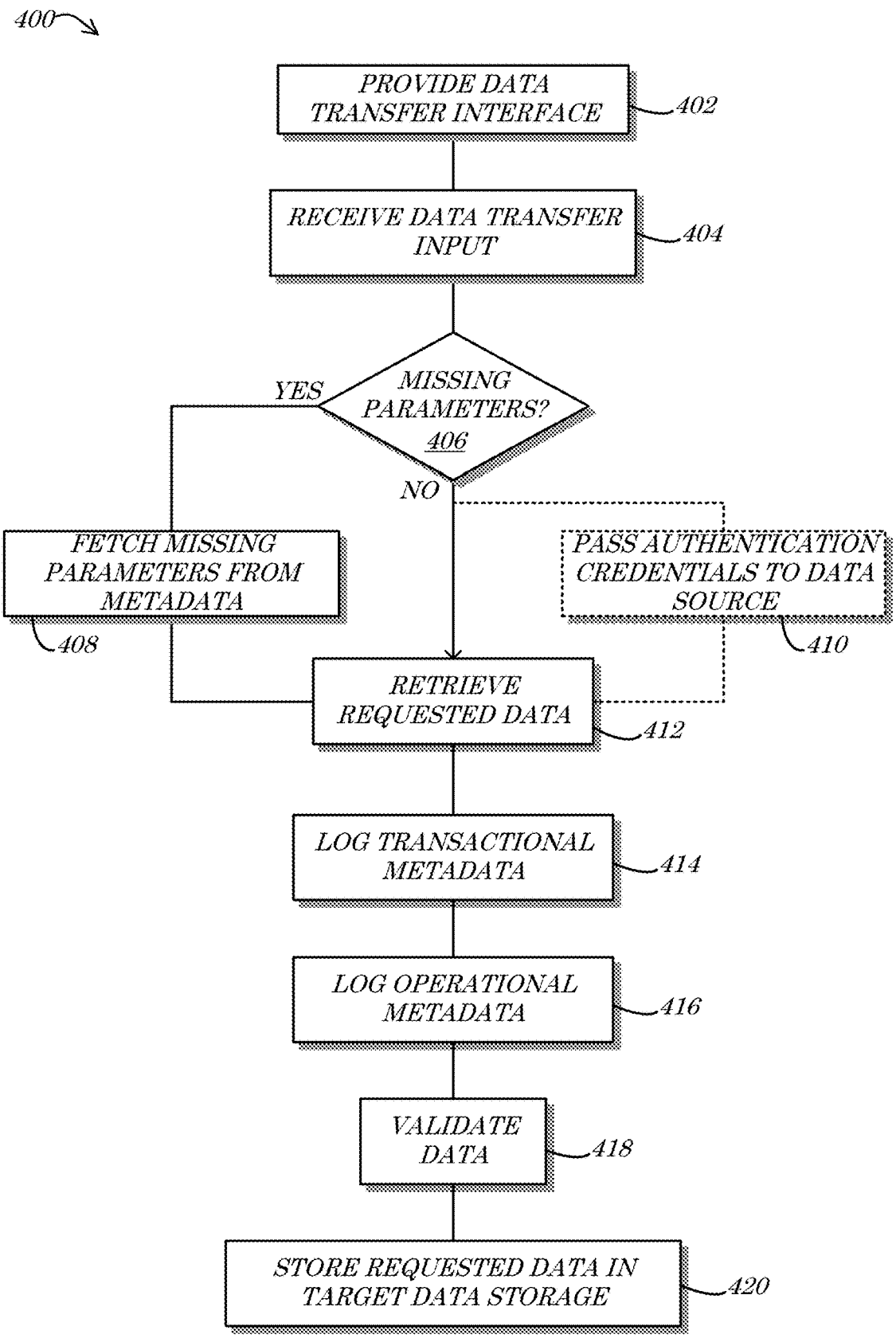
FIG. 4 is a flow diagram of a method according to some embodiments.

Turning now to FIG. 4, a flow diagram of a method 400 according to some embodiments is shown. In some embodiments, the method 400 may be performed and/or implemented by and/or otherwise associated with one or more specialized and/or specially-programmed computers (e.g., the user devices 102a-n, 202 and/or the controller devices 110, 210 of FIG. 1 and/or FIG. 2 herein), computer terminals, computer servers, computer systems and/or networks, and/or any combinations thereof (e.g., by one or more multi-threaded and/or multi-core processing units of an insurance company data processing system). In some embodiments, the method 400 may be embodied in, facilitated by, and/or otherwise associated with various input mechanisms and/or interfaces (not explicitly shown).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 140, 240a-f, 540, 640a-e of FIG. 1, FIG. 2, FIG. 5, FIG. 6A, FIG. 6B, FIG. 6C, FIG. 6D, and/or FIG. 6E herein) may store thereon instructions that when executed by a machine (such as a computerized processor) result in performance according to any one or more of the embodiments described herein.

According to some embodiments, the method 400 may comprise providing (e.g., by an electronic processing device) a data transfer interface, at 402. The data transfer interface may comprise, for example, a GUI having a plurality of graphical interface elements, such as interactive input components—e.g., picklists, combo-lists, drop-down menus, radio buttons, check boxes, etc. According to some embodiments, the GUI may comprise one interactive graphical element for each portion of input provided by a user to initiate and/or define a data transfer, storage, management, and/or analysis job, operation, and/or procedure. In some embodiments for example, the GUI may comprise a first interactive graphical element via which the user may select and/or define a first input parameter (and/or value thereof) and a second interactive graphical element via which the user may select and/or define a second input parameter (and/or value thereof). According to some embodiments, the first input parameter/value may comprise an indication of a database (and/or file or other data storage structure) name or identifier and the second input parameter/value may comprise an indication of a table (and/or other data storage sub-structure) name or identifier. In some embodiments, the GUI may be generated by execution of instructions on or via a user device and/or server (e.g., a controller device). The GUI may be generated, for example, by a mobile device application resident on and executed by a processing device of a user's mobile electronic device. According to some embodiments, the GUI may be provided and/or generated by a web browser or other thin-client user device application that accesses GUI information via a network address—e.g., via an Internet server, web page, and/or portal. In some embodiments, one or more commands and/or data may be transmitted from a centralized controller device to a remote user device that cause the user device to generate and/or display the GUI. In some embodiments, selection options made available via the interactive graphical element may be populated based on transactional and/or operational metadata. In the case of table names, for example, a picklist of table names for user selection may comprise a listing of names of tables that a current user (and/or other users of the same group, class, department, locality, etc.) has previously accessed, has access to (e.g., a list filtered based on security access rules), and/or have been populated with new data since a previous access date/time. According to some embodiments, pre-filtered and/or defined options may be generated with and/or as part of the interactive graphical elements and may be supplemented with an option to search for, define, and/or select other available options (e.g., as stored in an operational metadata store for a particular database and/or source data location).

In some embodiments, the method 400 may comprise receiving (e.g., by the electronic processing device and/or via an electronic data network) data transfer input, at 404. Input may be received, for example, via one or more of the interactive graphical elements (and/or otherwise via the GUI or other interface provided at 402). According to some embodiments, indications of input (e.g., selections and/or definitions of parameters and/or values thereof entered via one or more of the provided interactive graphical elements) may be transmitted to the central controller (e.g., a web and/or other server device) from a user device, and accordingly received by the central controller device. The input may comprise various user-selected and/or defined data, such as an identification of one or more parameters, parameter values, data operation characteristics (e.g., a requested data operation type, schedule, source, target, etc.), and/or user characteristics (e.g., a user identifier, user group identifier, user security and/or login credentials, etc.). In some embodiments, the input may be received via one or more input parameter files and/or via arguments entered via a command-line interface.

According to some embodiments, the method 400 may comprise identifying, computing, and/or otherwise determining (e.g., by the electronic processing device) missing parameters and/or values, at 406. Any or all parameters and/or values input via the GUI and/or otherwise received at 404 may be compared, for example, to a listing (and/or rules) defining a full set of parameters/values required for the requested operation. In some embodiments, different operation types may require different parameters/values and indications of those minimum and/or full sets of requirements may be stored in association with the applicable operation types. According to some embodiments, the requested operation type may be identified by retrieving and/or parsing a portion of the user input and compared to available operation types. Any or all matching available operation types may be utilized to query the corresponding data requirements for the particular operation. In such a manner, for example, a set of missing parameters and/or values may be identified as any required parameters/values for a requested operation that are missing from the user input. According to some embodiments, minimum parameter requirements and/or definitions of the required full set of parameters/values for an operation may be coded in a set of rules executed by the processing device and/or a specially-coded application thereof.

In some embodiments, such as in the case that a set of missing parameters is identified at 406, the method 400 may comprise fetching (e.g., by the electronic processing device) missing parameters from metadata storage, at 408. Information identifying the missing parameters may be utilized to query, for example, one or more of an operational and a transactional metadata storage as described herein, and any or all missing parameters/values may be received by the electronic processing device in response to the query. In such a manner, a user may only need to provide simplified (e.g., a reduced amount of) data to initiate a data operation by relying on the electronic processing device and specially-coded rules to automatically fetch (e.g., query, retrieve, identify, and/or otherwise obtain) any missing parameters/values. According to some embodiments, a first portion of the missing parameters/values may be obtained/fetched from a first metadata storage (e.g., a transactional metadata storage) and a second portion of the missing parameters/values may be obtained/fetched from a second metadata storage (e.g., a transactional metadata storage). In some embodiments, in the case that a missing parameter/value cannot be obtained from any available metadata storage (and/or third-party data storage device), an alert, prompt, instructions (e.g., options for remedying the error), and/or error message may be transmitted to the user and/or user device. The user may be prompted, for example, to provide and/or define any missing parameter/value that cannot be automatically retrieved and/or to choose a different type of data operation. In some embodiments, parameters and/or values provided as input by the user may be checked (e.g., compared) with stored metadata to validate that the data is appropriate. In the case that a user provides a listing of table names for a particular database, for example, the processing device may query the metadata to validate that the tables reside in the database, are spelled correctly, are accessible to the user, etc. In some embodiments, any discrepancies between the provided input and the stored metadata may be resolved automatically be replacing portions of the input with portions of the stored data (e.g., a misspelled table name may be automatically corrected for the user or a requested data column identified with an incorrect data type may be automatically switched to the correct data type—i.e., as stored).

According to some embodiments, the method 400 may comprise passing (e.g., by the electronic processing device and/or via the electronic data network) authentication credentials to a data source, at 410. In the case that authentication credentials were received as part of the user-defined input at 404, for example, such credentials (e.g., a user name or identifier, password, code, pass phrase, decryption key, etc.) may be forwarded automatically by the processing device to a device and/or service that houses and/or manages the data stored in the data source. In some embodiments, the credentials may be stored such that, subsequent to an initial receiving of the credentials from the user, such credentials may be automatically utilized on behalf of the user without requiring re-entry and/or other user input. According to some embodiments, the data source and/or an address (e.g., a network address or locator) may be provided and/or defined by the user input and/or may be retrieved (e.g., automatically, based on the user input) from the metadata storage.

In some embodiments, such as in the case that (i) a set of missing parameters is not identified at 406, (ii) the missing parameters/values are fetched at 408, or (iii) the authentication credentials are passed to the data source at 410, the method 400 may comprise executing (e.g., by the electronic processing device) the requested data operation, at 412. In the case of a data storage and/or transfer operation, for example, the requested data (identified by a combination of the user-input parameters/values and any automatically fetched parameters/values) may be retrieved from the data source. The requested data (and/or data storage structure or schema) may be retrieved, in some embodiments, from one or more relational and/or flat-file storage structures as described herein. In some embodiments, the data may be retrieved into a staging area, such as an intermediate data storage structure and/or a temporary data store (e.g., a cache and/or Random Access Memory (RAM) device).

According to some embodiments, the method 400 may comprise logging (e.g., by the electronic processing device) transactional metadata, at 414. Any or all information descriptive of the user's requested operation (e.g., a data transfer, storage, management, and/or analysis operation) may, for example, be acquired from the user input, any identified missing parameters and/or values, from the data source (and/or a data target), and/or from or in relation to the data retrieval. In some embodiments, transactional metadata may include, but is not limited to, a user identifier, user login and/or security credentials, requested operation type, user input parameters and/or values, user location, user group or department, identified missing parameters and/or values for the operation, storage locations of one or more of the missing parameters/values, source data location, source data location information, target location information, query statistics, query structure and/or information, and/or user preferences. According to some embodiments, the transactional metadata may be stored in a particular location, such as in a first data storage structure and/or device that is accessible to the electronic processing device and/or an application executed thereby.

In some embodiments, the method 400 may comprise logging (e.g., by the electronic processing device) operational metadata, at 416. Any or all information descriptive of the source data, target data, retrieved data, and/or devices associated therewith may, for example, be acquired from the user input, any identified missing parameters and/or values, from the data source (and/or a data target), and/or from or in relation to the data retrieval. In some embodiments, operational metadata may include, but is not limited to, source data schema information, target data schema information, device access parameters, device locations, device types and/or identifiers, database access information, database table space information, data table information, and/or data retrieval failure information. According to some embodiments, the operational metadata may be stored in a particular location, such as in a second data storage structure and/or device that is accessible to the electronic processing device and/or an application executed thereby. In some embodiments, the operational metadata may comprise data that was not utilized to retrieve the data, such as data not provided by the user request and not identified as missing parameter/value information. The operational metadata may comprise, for example, an import of a database schema and/or flat-file configuration information of a source and/or target utilized by the operation, but including table, column, and/or data information that was not utilized during the data retrieval and/or requested operation. In the case that a user requests that a single data table from a single database be retrieved into a single target flat-file, for example, the operational metadata may comprise details or information descriptive of additional tables and/or flat-files associated with the identified source and/or target. In such a manner, for example, the system may automatically expand the knowledge base from which missing parameters/values may be automatically fetched in future data operation requests.

According to some embodiments, the method 400 may comprise validating (e.g., by the electronic processing device) the data, at 418. One or more data metrics may be analyzed, for example, to determine whether or not the data retrieval at 412 was successful. In some embodiments, a row count may be identified for each of the retrieved data (in any particular table/file and/or for all retrieved tables/files) and the corresponding source data. In the case that the row counts are identical, it may be determined (e.g., computed) that the data operation was successful. According to some embodiments, a checksum may be utilized to verify and/or validate the data. One or more data columns/items (identified by the user as part of the user input and/or automatically selected based on column/item data types or randomly) may be summed for each of the retrieved/identified data and the source data, for example, and compared to ensure equality. In some embodiments, should either a row count or checksum not match, the data retrieval may be considered unsuccessful and error details descriptive of the mismatch may be recorded and/or the user may be notified (e.g., for data export operations and/or via a pop-up window or message via the GUI). According to some embodiments, timestamp data may be compared to current time data to validate data operations and/or to effectuate incremental data operations. In the case that a data operation (e.g., a particular data retrieval query) is being executed for an additional time (e.g., has been previously executed), for example, only those data records having timestamps (e.g., record creation and/or modification timestamp data) occurring subsequent to a previous occurrence of the data operation may be loaded or retrieved, e.g., at 412. In the case that the target is the same as the previous target, the target may only be incrementally loaded and/or updated with data that has been added and/or changed since the previous load/retrieval.

In some embodiments, the method 400 may comprise storing (e.g., by the electronic processing device) the requested data in a target data storage, at 420. In the case that data retrieved or loaded into a staging area has been validated, for example, the validated data may be transferred and/or retrieved into a target data storage structure, such as a target database and/or target flat-file, e.g., identified by the user in the initial data operation request input. According to some embodiments, one or more signals indicative of the retrieved data may be transmitted, by the processing device, to a target data storage device, such as a user workspace. In some embodiments, a subset of the requested data may be stored. As described herein, for example, certain sensitive information, such as customer Social Security numbers, credit card numbers, addresses, pricing information, etc., may be withheld or withheld from certain users or user groups (e.g., based on security class/permission). In some embodiments, the sensitive information may be stored, but may be stored in a masked, encoded, encrypted, and/or password-protected manner.

IV. Apparatus and Articles of Manufacture

Figure 5:
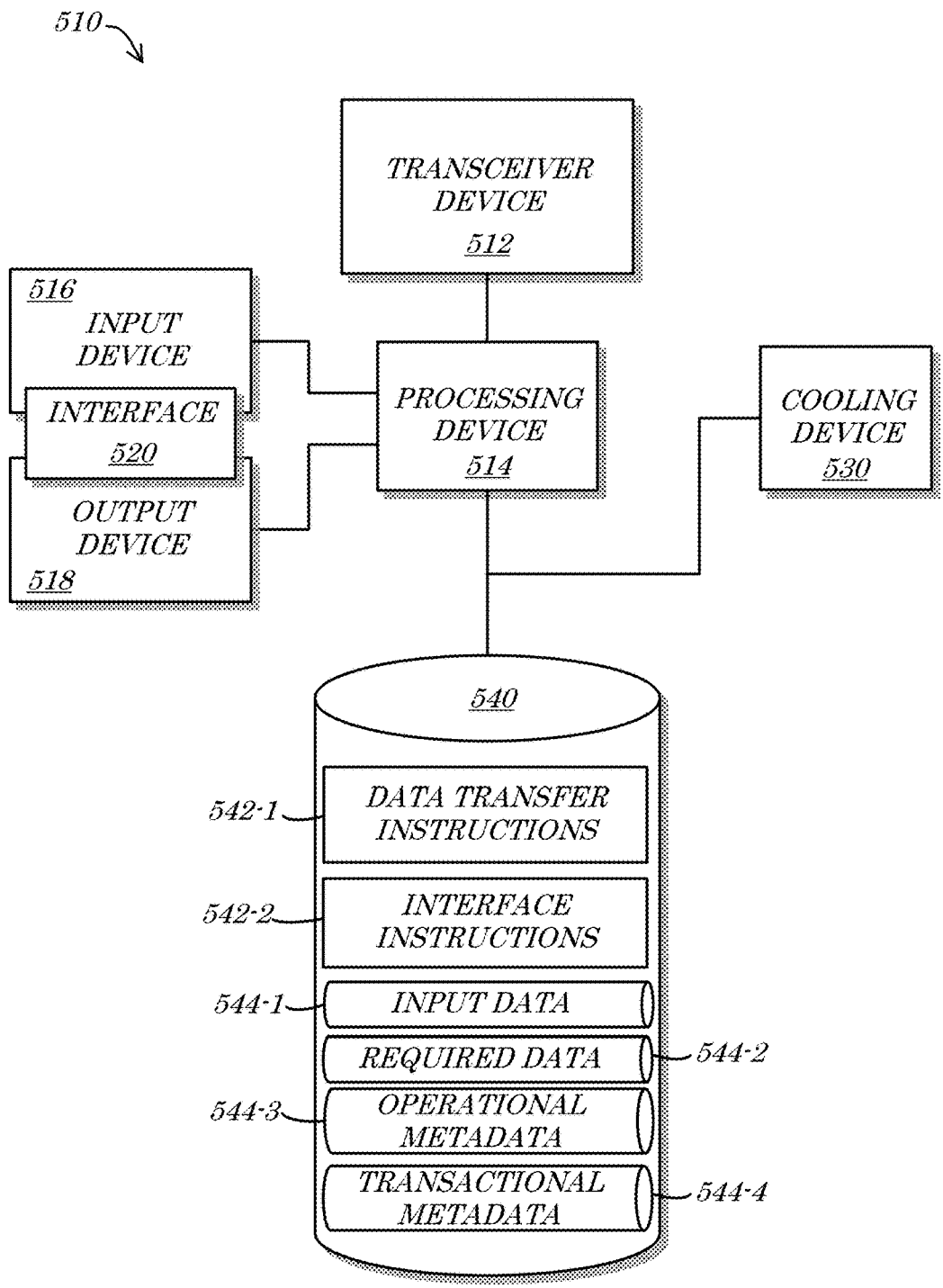
FIG. 5 is a block diagram of an apparatus according to some embodiments.
Figure 6A:
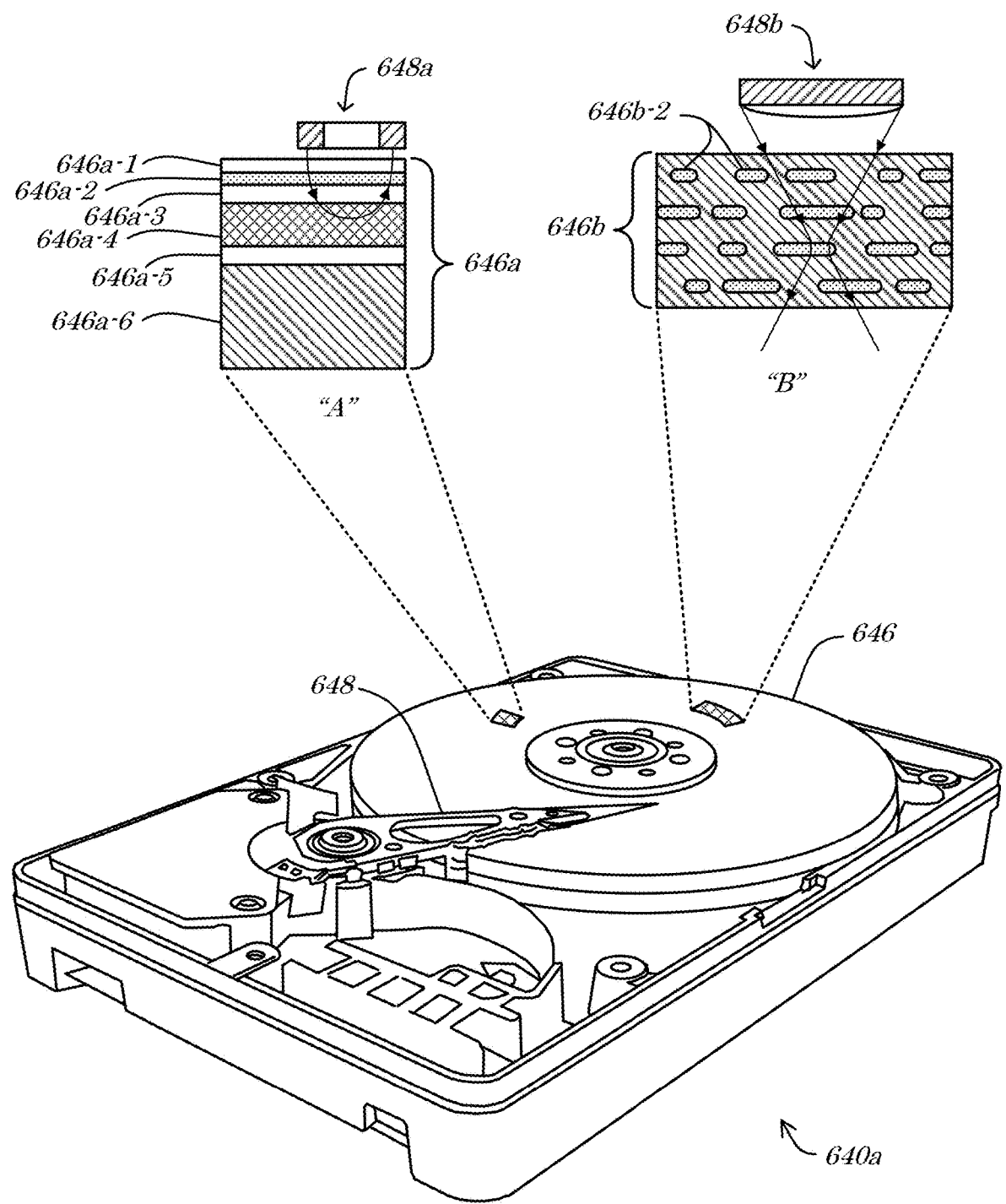
FIG. 6A, FIG. 6B, FIG. 6C, FIG. 6D, and FIG. 6E are perspective diagrams of exemplary data storage devices according to some embodiments.
Figure 6B:
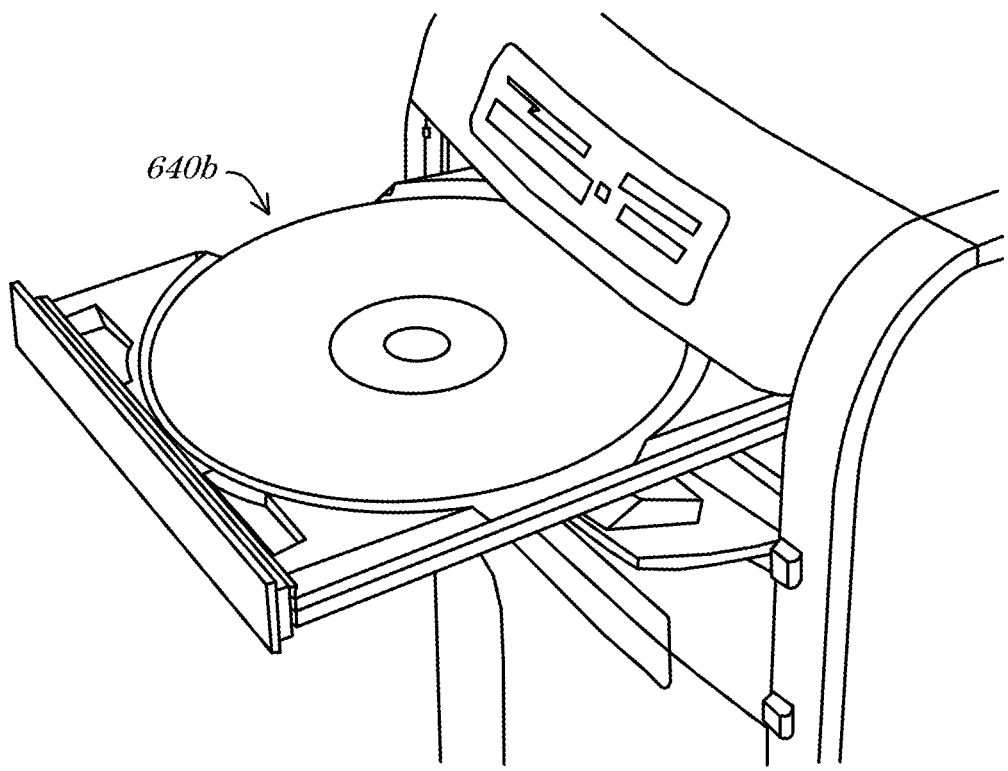
Figure 6C:
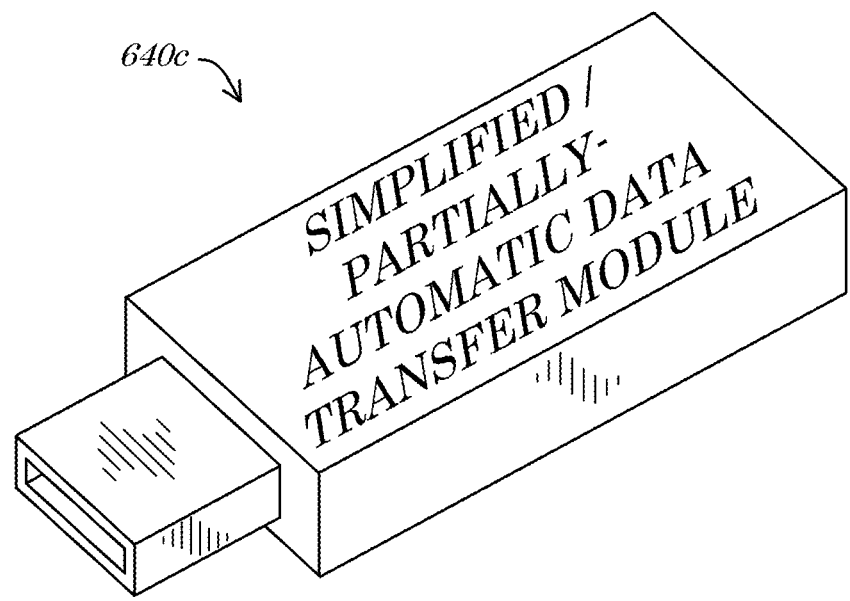
Figure 6D:
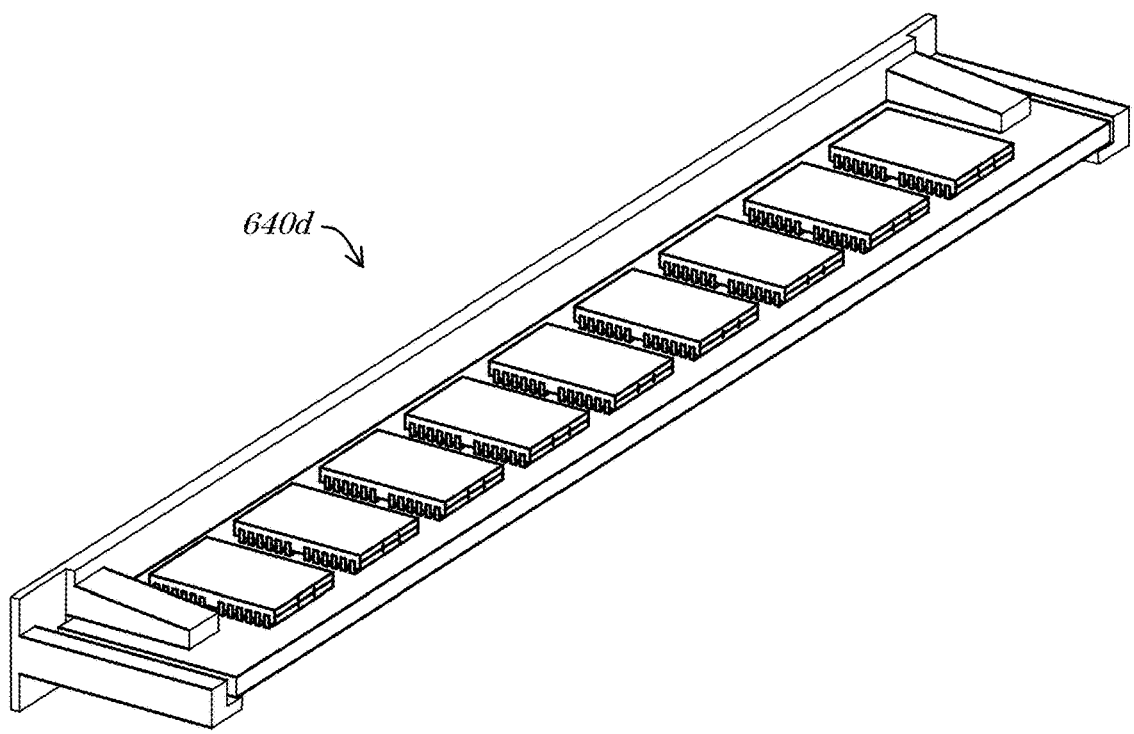
Figure 6E:
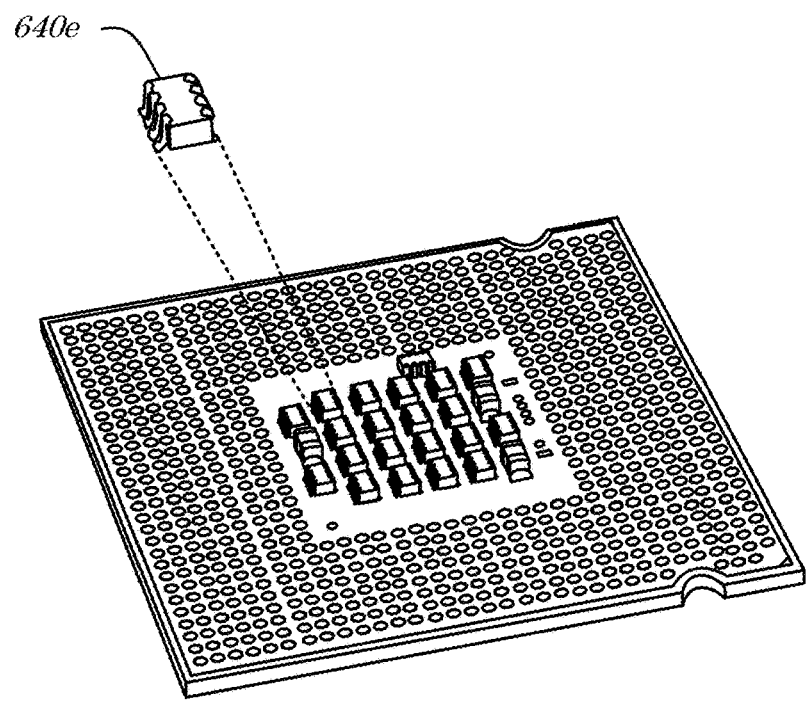

Turning to FIG. 5, a block diagram of an apparatus 510 according to some embodiments is shown. In some embodiments, the apparatus 510 may be similar in configuration and/or functionality to any of the user devices 102a-n, 202, the third-party device 106, and/or the controller devices 110, 210 of FIG. 1 and/or FIG. 2 herein, and/or may otherwise comprise a portion of the systems 100, 200 of FIG. 1 and/or FIG. 2 herein. The apparatus 510 may, for example, execute, process, facilitate, and/or otherwise be associated with the method 400 described in conjunction with FIG. 4 herein, and/or one or more portions thereof. In some embodiments, the apparatus 510 may comprise a transceiver device 512, one or more processing devices 514, an input device 516, an output device 518, an interface 520, a cooling device 530, and/or a memory device 540 (storing various programs and/or instructions 542 and data 544). According to some embodiments, any or all of the components 512, 514, 516, 518, 520, 530, 540, 542, 544 of the apparatus 510 may be similar in configuration and/or functionality to any similarly named and/or numbered components described herein. Fewer or more components 512, 514, 516, 518, 520, 530, 540, 542, 544 and/or various configurations of the components 512, 514, 516, 518, 520, 530, 540, 542, 544 may be included in the apparatus 510 without deviating from the scope of embodiments described herein.

In some embodiments, the transceiver device 512 may comprise any type or configuration of bi-directional electronic communication device that is or becomes known or practicable. The transceiver device 512 may, for example, comprise a Network Interface Card (NIC), a telephonic device, a cellular network device, a router, a hub, a modem, and/or a communications port or cable. In some embodiments, the transceiver device 512 may be coupled to receive input from a user device (not shown in FIG. 5), such as in the case that the apparatus 510 is utilized to provide simplified and/or partially-automated data operations in response to user requests and input, as described herein. The transceiver device 512 may, for example, comprise an Internet communications device that receives user inputs and initiates simplified and partially-automated data transfer operations between one or more relational and flat-file data stores, as described herein. According to some embodiments, the transceiver device 512 may be coupled to the processing device 514. In some embodiments, the transceiver device 512 may comprise an IR, RF, Bluetooth™, and/or Wi-Fi® network device coupled to facilitate communications between the processing device 514 and another device (such as a user device and/or a third-party device; not shown in FIG. 5).

According to some embodiments, the processing device 514 may be or include any type, quantity, and/or configuration of electronic and/or computerized processor that is or becomes known. The processing device 514 may comprise, for example, an Intel® IXP 2800 network processor or an Intel® XEON™ Processor coupled with an Intel® E7501 chipset. In some embodiments, the processing device 514 may comprise multiple, cooperative, and/or inter-connected processors, microprocessors, and/or micro-engines (e.g., a computational processing device and/or server cluster). According to some embodiments, the processing device 514 (and/or the apparatus 510 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 510 comprises a server such as a blade server, necessary power may be supplied via a standard AC outlet, power strip, surge protector, a PDU, and/or Uninterruptible Power Supply (UPS) device (none of which are shown in FIG. 5).

In some embodiments, the input device 516 and/or the output device 518 are communicatively coupled to the processing device 514 (e.g., via wired and/or wireless connections and/or pathways) and they may generally comprise any types or configurations of input and output components and/or devices that are or become known, respectively. The input device 516 may comprise, for example, a keyboard that allows an operator of the apparatus 510 to interface with the apparatus 510 (e.g., by a user, such as an insurance company non-IT data consumer, as described herein). The output device 518 may, according to some embodiments, comprise a display screen and/or other practicable output component and/or device. The output device 518 may, for example, provide GUI such as the interface 520 to a user (e.g., via a website). In some embodiments, the interface 520 may comprise portions and/or components of either or both of the input device 516 and the output device 518. According to some embodiments, the input device 516 and/or the output device 518 may, for example, comprise and/or be embodied in an input/output and/or single device such as a touch-screen monitor or display (e.g., that enables both input and output via the interface 520).

In some embodiments, the apparatus 510 may comprise the cooling device 530. According to some embodiments, the cooling device 530 may be coupled (physically, thermally, and/or electrically) to the processing device 514 and/or to the memory device 540. The cooling device 530 may, for example, comprise a fan, heat sink, heat pipe, radiator, cold plate, and/or other cooling component or device or combinations thereof, configured to remove heat from portions or components of the apparatus 510.

The memory device 540 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 540 may, according to some embodiments, be segmented into and/or comprise one or more of a plurality of partitions, environments, and/or databases (not depicted in FIG. 5) and/or may store one or more of data transfer instructions 542-1, interface instructions 542-2, input data 544-1, required data 544-2, operational metadata 544-3, and/or transactional metadata 544-4. In some embodiments, the data transfer instructions 542-1, interface instructions 542-2, input data 544-1, required data 544-2, operational metadata 544-3, and/or transactional metadata 544-4 may be utilized by the processing device 514 to provide output information via the output device 518 and/or the transceiver device 512.

According to some embodiments, the data transfer instructions 542-1 may be operable to cause the processing device 514 to process the input data 544-1, required data 544-2, operational metadata 544-3, and/or transactional metadata 544-4. Input data 544-1, required data 544-2, operational metadata 544-3, and/or transactional metadata 544-4 received via the input device 516 and/or the transceiver device 512 may, for example, be analyzed, sorted, filtered, decoded, decompressed, ranked, scored, plotted, and/or otherwise processed by the processing device 514 in accordance with the data transfer instructions 542-1. In some embodiments, input data 544-1, required data 544-2, operational metadata 544-3, and/or transactional metadata 544-4 may be fed (e.g., input) by the processing device 514 through one or more mathematical and/or statistical formulas and/or models in accordance with the data transfer instructions 542-1 to identify missing variables, parameters, and/or values, fetch missing variables, parameters, and/or values, and/or conduct data transfer, storage, management, and/or analysis operations utilizing a combination of user-input parameters/values and fetched parameters/values, in accordance with embodiments described herein.

In some embodiments, the interface instructions 542-2 may be operable to cause the processing device 514 to process the input data 544-1, required data 544-2, operational metadata 544-3, and/or transactional metadata 544-4. Input data 544-1, required data 544-2, operational metadata 544-3, and/or transactional metadata 544-4 received via the input device 516 and/or the transceiver device 512 may, for example, be analyzed, sorted, filtered, decoded, decompressed, ranked, scored, plotted, and/or otherwise processed by the processing device 514 in accordance with the interface instructions 542-2. In some embodiments, input data 544-1, required data 544-2, operational metadata 544-3, and/or transactional metadata 544-4 may be fed (e.g., input) by the processing device 514 through one or more mathematical and/or statistical formulas and/or models in accordance with the interface instructions 542-2 to provide, define, and/or generate a GUI and/or one or more interactive elements thereof, in accordance with embodiments described herein.

Any or all of the exemplary instructions 542 and data types 544 described herein and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the apparatus 510. According to some embodiments, the memory device 540 may be incorporated into and/or otherwise coupled to the apparatus 510 (e.g., as shown) or may simply be accessible to the apparatus 510 (e.g., externally located and/or situated). According to some embodiments, the apparatus 510 may comprise a system and/or a portion of a system that may, for example, include additional devices and/or objects, local or remote, than are depicted in FIG. 5. The apparatus 510 may comprise, for example, a system for providing simplified and/or partially-automated data operation services, such as may enable non-IT data consumers to access and/or manage data in "big data" systems, as described herein.

Referring to FIG. 6A, FIG. 6B, FIG. 6C, FIG. 6D, and FIG. 6E, perspective diagrams of exemplary data storage devices 640a-e according to some embodiments are shown. The data storage devices 640a-e may, for example, be utilized to store instructions and/or data such as the data transfer instructions 542-1, interface instructions 542-2, input data 544-1, required data 544-2, operational metadata 544-3, and/or transactional metadata 544-4, each of which is described in reference to FIG. 5 herein. In some embodiments, instructions stored on the data storage devices 640a-e may, when executed by one or more threads, cores, and/or processors (such as the processing device 514 of FIG. 5), cause the implementation of and/or facilitate the method 400 described in conjunction with FIG. 4 herein, and/or portions thereof.

According to some embodiments, a first data storage device 640a may comprise one or more various types of internal and/or external hard drives. The first data storage device 640a may, for example, comprise a data storage medium 646 that is read, interrogated, and/or otherwise communicatively coupled to and/or via a disk reading device 648. In some embodiments, the first data storage device 640a and/or the data storage medium 646 may be configured to store information utilizing one or more magnetic, inductive, and/or optical means (e.g., magnetic, inductive, and/or optical-encoding). The data storage medium 646, depicted as a first data storage medium 646a for example (e.g., breakout cross-section "A"), may comprise one or more of a polymer layer 646a-1, a magnetic data storage layer 646a-2, a non-magnetic layer 646a-3, a magnetic base layer 646a-4, a contact layer 646a-5, and/or a substrate layer 646a-6. According to some embodiments, a magnetic read head 646a may be coupled and/or disposed to read data from the magnetic data storage layer 646a-2.

In some embodiments, the data storage medium 646, depicted as a second data storage medium 646b for example (e.g., breakout cross-section "B"), may comprise a plurality of data points 646b-2 disposed with the second data storage medium 646b. The data points 646b-2 may, in some embodiments, be read and/or otherwise interfaced with via a laser-enabled read head 648b disposed and/or coupled to direct a laser beam through the second data storage medium 646b.

In some embodiments, a second data storage device 640b may comprise a CD, CD-ROM, DVD, Blu-Ray™ Disc, and/or other type of optically-encoded disk and/or other storage medium that is or becomes know or practicable. In some embodiments, a third data storage device 640c may comprise a USB keyfob, dongle, and/or other type of flash memory data storage device that is or becomes know or practicable. In some embodiments, a fourth data storage device 640d may comprise RAM of any type, quantity, and/or configuration that is or becomes practicable and/or desirable. In some embodiments, the fourth data storage device 640d may comprise an off-chip cache such as a Level 2 (L2) cache memory device. According to some embodiments, a fifth data storage device 640e may comprise an on-chip memory device such as a Level 1 (L1) cache memory device.

The data storage devices 640a-e may generally store program instructions, code, and/or modules that, when executed by a processing device cause a particular machine to function in accordance with one or more embodiments described herein. The data storage devices 640a-e depicted in FIG. 6A, FIG. 6B, FIG. 6C, FIG. 6D, and FIG. 6E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined herein and includes many exemplary protocols that are also applicable here.

V. Terms and Rules of Interpretation

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "user device", a "remote device", or a "network device". As used herein, each of a "user device" and a "remote device" is a subset of a "network device". The "network device", for example, may generally refer to any device that can communicate via a network, while the "user device" may comprise a network device that is owned and/or operated by or otherwise associated with a particular user (and/or group of users—e.g., via shared login credentials and/or usage rights), and while a "remote device" may generally comprise a device remote from a primary device or system component and/or may comprise a wireless and/or portable network device. Examples of user, remote, and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. User, remote, and/or network devices may, in some embodiments, comprise one or more network components.

As used herein, the term "network component" may refer to a user, remote, or network device, or a component, piece, portion, or combination of user, remote, or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled, but not claimed in the present application.

What is claimed is:

1. A system for simplified and partially-automated data transfer operations, comprising:
   a plurality of computer servers, each computer server comprising a plurality of electronic processing devices; and
   at least one non-transitory electronic data storage device in communication with the plurality of computer servers, the non-transitory electronic data storage device storing:
   (i) coded rules;
   (ii) data transfer metadata including at least one of a data type, data format, compression algorithm, archive type, data partition, and data bucket, for a database; and
   (iii) instructions that when executed by the plurality of electronic processing devices of the plurality of computer servers, result in:
      providing, to a remote user device, a data transfer interface comprising a plurality of interactive graphical input elements;
      receiving, in response to the providing and via at least one of the interactive graphical input elements, an indication of a user request to initiate a data transfer operation, the request comprising:
         (a) an indication of a type of data transfer operation requested; and
         (b) an indication of at least one value for at least one parameter required to initiate the operation;
      automatically comparing, applying at least one of the coded rules, the at least one value for at least one parameter required to initiate the operation with a stored indication of a set of parameters required to initiate the operation;
      automatically identifying, based on the comparing, a subset of the set of parameters that are missing from the request;
      automatically fetching, from the data transfer metadata, values for the subset of the set of parameters that are missing from the request;
      automatically retrieving data, from the database, in accordance with the at least one value for the at least one parameter required to initiate the operation and the values for the subset of the set of parameters that are missing from the request; and
      storing the retrieved data in at least one of a data staging area in the at least one non-transitory electronic data storage device and a target data storage device.

2. The system of claim 1, wherein the instructions, when executed by the plurality of electronic processing devices of the plurality of computer servers, further result in:
   logging, in the at least one non-transitory electronic data storage device, metadata descriptive of the request from the user.

3. The system of claim 1, wherein the instructions, when executed by the plurality of electronic processing devices of the plurality of computer servers, further result in:
   logging, in the at least one non-transitory electronic data storage device, metadata descriptive of at least one of the database and the target data storage device.

4. The system of claim 1, wherein the instructions, when executed by the plurality of electronic processing devices of the plurality of computer servers, further result in:
   validating the retrieved data.

5. The system of claim 4, wherein the validating, comprises:
   comparing a row count of the retrieved data with a row count of corresponding data in the database.

6. The system of claim 4, wherein the validating, comprises:
   comparing a checksum for a column of the retrieved data with a checksum for a corresponding column of data in the database.

7. The system of claim 4, wherein the validating, comprises:
   comparing a row count of the retrieved data with a row count of corresponding data in the database; and
   comparing a checksum for a column of the retrieved data with a checksum for a corresponding column of data in the database.

8. The system of claim 4, wherein the instructions, when executed by the plurality of electronic processing devices of the plurality of computer servers, further result in:
   transmitting, to the remote user device and via the data transfer interface, in the case that the validating fails, an alert.

9. The system of claim 1, wherein the indication of at least one value for at least one parameter required to initiate the operation comprises:
   an indication of at least one database name; and
   an indication of at least one table name.

10. The system of claim 1, wherein the instructions, when executed by the plurality of electronic processing devices of the plurality of computer servers, further result in:
    identifying, based on at least one of the coded rules, at least one of a data type and a data format that is restricted for read access to a subset of security classes of users;
    identifying a security class of a user associated with the received request;
    identifying, based on at least one of the indication of at least one value for at least one parameter required to initiate the operation and the values for the subset of the set of parameters that are missing from the request, a data element that matches the at least one of the data type and the data format that is restricted for read access to the subset of security classes of users; and
    restricting access to the identified data element.

11. The system of claim 10, wherein the restricting of the access comprises at least one of: (i) masking the data element during the storing of the retrieved data; and (ii) excluding the data element from at least one of the retrieving and the storing of the retrieved data.

12. A system for facilitating data transfer operations, comprising:
    a plurality of computer servers, each computer server comprising a plurality of electronic processing devices; and a plurality of non-transitory electronic data storage devices in communication with the plurality of computer servers, the plurality of non-transitory electronic data storage devices, comprising:
  a first non-transitory electronic data storage device storing a source database, the source database storing source data;
  a second non-transitory electronic data storage device storing a target database, the target database storing target data; and
  a third non-transitory electronic data storage device storing:
    (i) coded rules;
    (ii) data transfer metadata including at least one of a data type, data format, compression algorithm, archive type, data partition, and data bucket, for each of the source database and the target database;
    (iii) a listing of parameters required to execute each possible type of data transfer operation; and
    (iv) instructions that when executed by the plurality of electronic processing devices of the plurality of computer servers, result in:
      providing, to a remote user device, a data transfer interface comprising a plurality of interactive graphical input elements, wherein at least one of the plurality of interactive graphical input elements comprises a data transfer operation types menu;
      receiving, in response to the providing and via the data transfer operation types menu, an indication of a user request to initiate a data transfer operation having a type comprising at least one of an append, a merge, a full refresh, a copy, an import, and an export data transfer operation type;
      receiving, in response to the providing and via at least one of the interactive graphical input elements, an indication of at least one value for at least one parameter required to initiate the requested data transfer operation type;
      automatically comparing, applying at least one of the coded rules, the at least one value for at least one parameter required to initiate the requested data transfer operation type with the listing of the parameters required to execute the requested data transfer operation type;
      automatically identifying, based on the comparing, a subset of the required parameters that are missing from the request;
      automatically fetching, from the data transfer metadata, values for the subset of the required parameters that are missing from the request;
      automatically retrieving data, from at least one of the source database and the target database, in accordance with the at least one value for the at least one parameter required to initiate the requested data transfer operation and the values for the subset of the required parameters that are missing from the request; and
      storing the retrieved data in at least one of a data staging area in at least one of the non-transitory electronic data storage devices and the target database.

* * * * *